Patented Aug. 7, 1934

1,969,164

UNITED STATES PATENT OFFICE 1,969,164

CRINKLED COATED SURFACE

Karel Toll, Passaic, N. J., assignor, by mesne assignments, to Chadeloid Chemical Company, New York, N. Y., a corporation of West Virginia No Drawing. Application November 17, 1931, Serial No. 575,645

11 Claims. (Cl. 91—68)

This invention relates to crinkled coated surfaces, and more particularly to the method of obtaining uniformity of crinkled design when such surfaces are produced in colors.

Crinkled surfaces may be produced on fabric, wood, paper, and metal, and similar semi-porous or non-porous materials, by applying thereto a mixture of suitably treated oils. The coating has a smooth, paint-like appearance when first applied, and transforms upon drying into a crinkled but unbroken surface, resulting from the formation of spaced ridges in the surface coating.

Crinkled surfaces which are produced by the use of a coating preparation comprising simply a mixture of separately and differently treated oils, as for example China-wood oil and soya bean oil, have a fairly definite design, although the size and spacing of the ridges may be varied by various means. It is quite desirable, however, from a commercial point of view, to produce such surfaces in a variety of colors, in which instances coloring pigments are added to the coating mixture. It has been noted in the preparation of colored surface coatings of this character that the crinkled design is not uniform but varies with the several colors commonly used. It is an object of the present invention to produce colored crinkled coated surfaces of uniform crinkled design.

According to my discoveries, the effect of coloring pigments in varying the crinkled design may be compensated by incorporating a stabilizing agent with the coated mixture. I have found that the addition of such a constituent to the coating preparation produces a substantially uniform crinkled design regardless of the coloring pigment used.

The term "stabilizing agent" is used herein and in the claims to cover such constituents or components which compensate the tendency of a pigment to modify the crinkle, so that in the presence of such components, a uniform crinkle effect is obtained.

My experiments show that zinc oxide gives excellent results in stabilizing the crinkled design obtained with colored coating mixtures. When this constituent is included in the coating preparation the spaced ridges comprising the crinkled surface follow substantially the same pattern irrespective of the color of the surface. I have also found that lithopone, white lead, and titanium oxide may be used to advantage as stabilizers in the production of colored crinkled surfaces.

In preparing a coating mixture according to the present invention, the constituent oils are first treated and mixed. The desired coloring pigment, together with a stabilizing agent, as for example zinc oxide, are then added to the mixture of oils and thoroughly agitated therewith to uniformly disperse the pigment and stabilizer. It is immaterial in preparing such coating mixtures whether the stabilizer is added before or after the coloring pigments. In practice, I have found it advantageous to mix the stabilizer with the coloring pigment and then add the two constituents to the oils.

The amount of stabilizing agent added to the coating mixture will be dependent upon the particular coloring pigment present, but is generally added in an amount equal to the weight of the constituent oils. The proportion of stabilizing agent present may, however, be varied from about 75% to about 150% of the weight of oils present.

To illustrate the application of the invention to the production of colored crinkled coated surfaces having uniform crinkled design the following typical operations are presented. It is to be understood, however, that the specific data included in these examples is set forth by way of illustration only and not by way of limitation.

In a first operation, coating mixture was prepared by heat treating two separate batches of China-wood oil and soya bean oil (the proportion of the oils in each batch being two parts of China-wood oil to one part of soya bean oil), under differing conditions of temperature and time of treatment; combining the two treated portions and mixing therewith 20% by weight of chrome green. The coating was applied to a semi-porous fabric of the oilcloth type and after drying thereon presented a crinkled surface of distinctive design. The crinkled design, while fairly regular, was quite different from the crinkled design obtained with similar coating mixtures having no coloring pigment present.

In a second operation, a coating mixture was prepared as in the preceding example, but the chrome green was replaced by a pigment known to the trade as Milori blue. The coating was applied to a fabric of the oilcloth type under the same conditions of application as in the first coating operation and the blue coating, when dried, presented a crinkled surface comprising spaced ridges arranged in a fairly regular design but having a totally different general appearance from the green crinkled surface, due to a different arrangement of the ridges.

The two preceding operations were then repeated with the addition of zinc oxide to the coating mixture in each case in an amount equal to the weight of the constituent oils. When the coating mixtures prepared in this modified manner were applied to the fabric and dried, the crinkled design was substantially the same in each case and resembled very closely the crinkled design obtained when no coloring pigments are present in the coating mixture.

I claim:

1. In a process of producing crinkled coated surfaces by the formation of spaced ridges in an applied crinkle forming coating mixture containing coloring pigment which pigment modifies the character of crinkle obtained, the step which comprises producing a substantially uniform crinkle design in a variety of colors by the addition of a stabilizing agent compensating for the crinkle modifying effect of the pigment to the coating mixture.

2. In a process of producing crinkled coated surfaces by the formation of spaced ridges in an applied crinkle forming coating mixture of treated oils and coloring pigment which pigment modifies the character of crinkle obtained, the step which comprises producing a substantially uniform crinkle design in a variety of colors by the addition of a stabilizing agent compensating for the crinkle modifying effect of the pigment to the coating mixture, the amount of said agent added being not less than 75% nor more than 150% of the weight of treated oils in said mixture.

3. In a process of producing crinkled coated surfaces by the formation of spaced ridges in an applied crinkle forming coating mixture of treated oils and coloring pigment which pigment modifies the character of crinkle obtained, the step which comprises producing a substantially uniform crinkle design in a variety of colors by the addition of a stabilizing agent compensating for the crinkle modifying effect of the pigment to the coating mixture in an amount of the order of 100% of the weight of treated oils in said mixture.

4. In a process of producing crinkled coated surfaces by the formation of spaced ridges in an applied crinkle forming coating mixture containing coloring pigment which pigment modifies the character of crinkle obtained, the step which comprises producing a substantially uniform crinkle design in a variety of colors by the addition of zinc oxide to the coating mixture.

5. In a process of producing crinkled coated surfaces by the formation of spaced ridges in an applied crinkle forming coating mixture containing coloring pigment which pigment modifies the character of crinkle obtained, the step which comprises producing a substantially uniform crinkle design in a variety of colors by the addition of white lead to the coating mixture.

6. In a process of producing crinkled coated surfaces by the formation of spaced ridges in an applied crinkle forming coating mixture containing coloring pigment which pigment modifies the character of crinkle obtained, the step which comprises producing a substantially uniform crinkle design in a variety of colors by the addition of lithopone to the coating mixture.

7. A process of producing crinkle coatings which comprises applying to an article of manufacture, a pigmented drying oil coating composition yielding a crinkle surface when dried, the pigment present normally modifying the character of crinkle obtained, said coating containing a stabilizing agent differing from said pigment and compensating for the crinkle modifying effect of the pigment and in amount to neutralize in part at least, the tendency of the pigment to modify the crinkle, and drying the coating, whereby a crinkle surface is obtained resembling the crinkle design secured in the absence of said pigment.

8. A process of producing crinkle coatings which comprises applying to an article of manufacture, a pigmented drying oil coating composition yielding a crinkle surface when dried, the pigment normally modifying the character of crinkle obtained, said coating containing a stabilizing agent differing from said pigment and compensating for the crinkle modifying effect of the pigment and selected from the group of zinc oxide, lithopone, white lead, and titanium oxide, and in amount to neutralize in part at least, the tendency of the pigment to modify the crinkle, and drying the coating, whereby a crinkle surface is obtained resembling the crinkle design secured in the absence of said pigment.

9. A process of producing multi-colored crinkle coatings of substantially uniform crinkle which comprises applying to an article of manufacture, pigmented drying oil base crinkle coatings, the coatings containing different pigments, each such pigmented coating normally producing a modified crinkle effect in the absence of a stabilizing agent, and each pigmented coating containing a stabilizing agent compensating for the crinkle modifying effect of the pigment in amount to neutralize in part at least, the tendency of pigment to modify the crinkle, and drying said coatings, whereby a multi-colored crinkle coating is obtained of substantially uniform crinkle effect.

10. An article of manufacture carrying a pigmented drying oil base crinkle coating containing a pigment which normally modifies the character of crinkle, said coating also containing a stabilizing agent differing from said pigment and compensating for the crinkle modifying effect of the pigment, and in amount to neutralize in part at least, the tendency of the pigment to modify the crinkle, whereby a crinkle surface is obtained resembling the crinkle design secured in the absence of said pigment.

11. An article of manufacture carrying multi-colored drying oil base crinkle coatings, the coatings containing different pigments which individually in the absence of a stabilizing agent modify the character of crinkle effect, each coating containing a stabilizing agent differing from said pigment and compensating for the crinkle modifying effect of the pigment in an amount to neutralize in part at least, the tendency of the pigment to modify the crinkle, resulting in a multi-colored crinkle coating of substantial uniform crinkle effect.

KAREL TOLL.